(12) United States Patent
Stark

(10) Patent No.: US 11,642,599 B2
(45) Date of Patent: *May 9, 2023

(54) VIDEO GAME CONTROLLER ADAPTER FOR HOLDING A DISPLAY OF A PORTABLE VIDEO GAME SYSTEM

(71) Applicant: Fixture Gaming, LLC, Phoenix, AZ (US)

(72) Inventor: Austin Stark, Phoenix, AZ (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/019,554

(22) Filed: Sep. 14, 2020

(65) Prior Publication Data

US 2020/0406153 A1   Dec. 31, 2020

Related U.S. Application Data

(63) Continuation of application No. 16/682,144, filed on Nov. 13, 2019, now Pat. No. 10,773,172.

(60) Provisional application No. 62/781,330, filed on Dec. 18, 2018.

(51) Int. Cl.
| | | |
|---|---|---|
| *A63F 13/00* | (2014.01) | |
| *A63F 13/92* | (2014.01) | |
| *A63F 13/245* | (2014.01) | |
| *A63F 13/98* | (2014.01) | |

(52) U.S. Cl.
CPC ............ *A63F 13/92* (2014.09); *A63F 13/245* (2014.09); *A63F 13/98* (2014.09)

(58) Field of Classification Search
None
See application file for complete search history.

(56) References Cited

U.S. PATENT DOCUMENTS

| | | | | |
|---|---|---|---|---|
| D346,408 | S * | 4/1994 | Lee | D21/330 |
| D484,918 | S * | 1/2004 | Okada | D21/330 |
| 7,653,771 | B2 * | 1/2010 | Liberty | G06F 1/1632 |
| | | | | 463/37 |
| 7,733,637 | B1 | 6/2010 | Lam | |
| 7,833,097 | B1 * | 11/2010 | Maddox | A63F 13/23 |
| | | | | 463/47 |
| 8,109,569 | B2 * | 2/2012 | Mitchell | B60N 2/815 |
| | | | | 297/391 |
| D684,980 | S * | 6/2013 | Chun | D14/447 |
| 8,480,493 | B2 * | 7/2013 | Liotta | A63F 13/92 |
| | | | | 463/37 |
| 8,504,182 | B2 * | 8/2013 | Leung | G06F 1/1632 |
| | | | | 361/679.41 |
| 9,081,545 | B1 * | 7/2015 | Lin | G06F 1/1632 |
| 9,141,108 | B2 * | 9/2015 | Allen | G05D 1/0016 |
| 9,451,821 | B1 * | 9/2016 | Estigoy | F16B 2/245 |
| 9,570,249 | B1 * | 2/2017 | Douglas | H01H 9/025 |
| 9,592,453 | B2 | 3/2017 | Townley et al. | |

(Continued)

*Primary Examiner* — Paul A D'Agostino
(74) *Attorney, Agent, or Firm* — Schmeiser, Olsen & Watts, LLP

(57) ABSTRACT

A video game controller adapter for holding a display of a portable video game system is provided. The base easily snaps on to a controller using a controller attachment device, thereby holding the display the portable gaming system above the controller in handheld mode. The bottom of the base is flat and designed to balance on a level surface to allow for a tabletop mode. This is especially useful for multiplayer gaming. In tabletop mode, the adapter allows plenty of space beneath the charging port to allow the user to plug in their device during game play.

18 Claims, 8 Drawing Sheets

(56) References Cited

U.S. PATENT DOCUMENTS

| | | | | |
|---|---|---|---|---|
| D783,014 S * | 4/2017 | Chun | | D14/253 |
| 9,687,735 B2 * | 6/2017 | Hong | | A63F 13/24 |
| 9,711,980 B2 | 7/2017 | Hodges et al. | | |
| 9,802,118 B2 * | 10/2017 | Hirshberg | | A63F 13/24 |
| 9,808,713 B1 | 11/2017 | Townley et al. | | |
| D823,949 S * | 7/2018 | Lu | | D21/566 |
| 10,456,670 B2 * | 10/2019 | Chen | | A63F 13/98 |
| D865,749 S * | 11/2019 | Fraiser | | D14/253 |
| 10,471,346 B2 | 11/2019 | Yamashita et al. | | |
| 10,882,463 B2 * | 1/2021 | Yang | | H04M 1/04 |
| D909,362 S * | 2/2021 | Cheng | | D14/253 |
| D929,392 S * | 8/2021 | Shi | | D14/253 |
| 11,202,963 B2 * | 12/2021 | Esselstrom | | F16B 2/12 |
| D945,409 S * | 3/2022 | Tang | | D14/253 |
| 2002/0155890 A1 * | 10/2002 | Ha | | A63F 13/28 |
| | | | | 463/36 |
| 2003/0064860 A1 * | 4/2003 | Yamashita | | A63F 13/65 |
| | | | | 482/8 |
| 2004/0023719 A1 * | 2/2004 | Hussaini | | A63F 13/06 |
| | | | | 463/37 |
| 2004/0195305 A1 * | 10/2004 | Dotson | | H01H 13/86 |
| | | | | 235/145 R |
| 2004/0235566 A1 * | 11/2004 | Hussaini | | A63F 13/92 |
| | | | | 463/37 |
| 2005/0236536 A1 * | 10/2005 | Fan | | F16M 11/041 |
| | | | | 248/176.3 |
| 2007/0021210 A1 * | 1/2007 | Tachibana | | A63F 13/95 |
| | | | | 463/37 |
| 2007/0283610 A1 * | 12/2007 | Mounce | | G09F 21/02 |
| | | | | 40/658 |
| 2008/0254899 A1 | 10/2008 | Weston et al. | | |
| 2009/0325717 A1 | 12/2009 | Lee-him | | |
| 2010/0052546 A1 * | 3/2010 | Williams | | F21V 17/06 |
| | | | | 362/244 |
| 2010/0069160 A1 * | 3/2010 | Barrett | | G07F 17/3218 |
| | | | | 463/47 |
| 2010/0079356 A1 * | 4/2010 | Hoellwarth | | G09G 3/001 |
| | | | | 345/8 |
| 2010/0320665 A1 * | 12/2010 | Barnes | | F42B 6/06 |
| | | | | 269/57 |
| 2011/0198365 A1 | 8/2011 | Rosenberg | | |
| 2011/0230178 A1 | 9/2011 | Jones et al. | | |
| 2012/0025036 A1 * | 2/2012 | Huang | | F16M 11/041 |
| | | | | 248/122.1 |
| 2012/0189156 A1 * | 7/2012 | Leung | | G06F 1/1632 |
| | | | | 381/387 |
| 2012/0244944 A1 * | 9/2012 | Kotkin | | A63F 13/24 |
| | | | | 463/37 |
| 2013/0120258 A1 | 5/2013 | Maus | | |
| 2013/0214998 A1 * | 8/2013 | Andes | | G09G 5/10 |
| | | | | 345/8 |
| 2014/0200085 A1 * | 7/2014 | Bares | | A63F 13/98 |
| | | | | 463/47 |
| 2014/0213365 A1 * | 7/2014 | Cao | | A63F 13/245 |
| | | | | 463/37 |
| 2014/0263931 A1 * | 9/2014 | Chen | | F16M 13/00 |
| | | | | 248/576 |
| 2014/0364232 A1 * | 12/2014 | Cramer | | A63F 13/98 |
| | | | | 463/37 |
| 2015/0011165 A1 * | 1/2015 | Shinkawa | | H04B 1/3888 |
| | | | | 455/90.3 |
| 2015/0201723 A1 * | 7/2015 | Rayner | | F16M 13/04 |
| | | | | 224/191 |
| 2015/0202530 A1 | 7/2015 | Zheng | | |
| 2016/0001176 A1 * | 1/2016 | Chen | | A63F 13/98 |
| | | | | 463/37 |
| 2016/0234356 A1 * | 8/2016 | Thomas | | H04K 3/84 |
| 2017/0072872 A1 * | 3/2017 | Balmer | | F16M 13/00 |
| 2017/0264329 A1 * | 9/2017 | Balmer | | F16M 11/10 |
| 2018/0266457 A1 * | 9/2018 | Du | | F16B 2/12 |
| 2020/0050291 A1 | 2/2020 | Pellen et al. | | |
| 2020/0108312 A1 * | 4/2020 | Chen | | A63F 13/426 |
| 2020/0282309 A1 * | 9/2020 | Liao | | A63F 13/92 |
| 2020/0324199 A1 * | 10/2020 | Berns | | A63F 13/23 |
| 2021/0023444 A1 * | 1/2021 | Fuchs | | A63F 13/92 |
| 2021/0178255 A1 * | 6/2021 | Basara | | A63F 13/235 |

* cited by examiner

VIDEO GAME CONTROLLER ADAPTER FOR HOLDING A DISPLAY OF A PORTABLE VIDEO GAME SYSTEM

CROSS REFERENCE TO RELATED APPLICATION[S]

This application is a Continuation of U.S. Patent Application entitled "VIDEO GAME CONTROLLER ADAPTER FOR HOLDING A DISPLAY OF A PORTABLE VIDEO GAME SYSTEM," Ser. No. 16/682,144, filed Nov. 13, 2019, which claims priority to U.S. Provisional Patent Application entitled "VIDEO GAME CONTROLLER ADAPTER FOR HOLDING A DISPLAY OF A PORTABLE VIDEO GAME SYSTEM," Ser. No. 62/781,330, filed Dec. 18, 2018, the disclosure of which is hereby incorporated entirely herein by reference.

BACKGROUND OF THE INVENTION

Technical Field

This invention relates generally to an adapter for a video game controller and more particularly to an adapter for a video game controller for holding a display of a portable game system.

State of the Art

Portable video game systems are becoming more and more popular. One such system is the Nintendo Switch. Some experts estimate it may sell 100 million units. It has a 6.2" screen and comes with a dock to connect to a TV in addition to portable mode. There are two types of controllers sold by Nintendo for the Switch console—a Joy-Con controller and a Pro Controller. The console comes with two Joy-Cons which are small controllers that slide into the sides of the screen and allow the user to take the game on-the-go. The Pro Controller can be purchased separately, and is much more ergonomic, mimicking the style of other gaming controllers (e.g., PlayStation or Xbox). Many users buy Pro Controllers to make playing on a TV more comfortable. Once a user experiences play on the Pro Controller, going back to the Joy-Con's small buttons and non-ergonomic design is not appealing. In addition, there does not exist a good way to use the Pro Controller with the small screen on-the-go.

Accordingly, there is a need for an adapter that can be used with a Pro Controller while holding the display of the portable video game system.

SUMMARY OF THE INVENTION

An embodiment includes an adapter for use with a controller and a display of a portable video game system, the adapter comprising: a controller attachment device configured to couple to the controller; a display attachment device configured to couple to the display of the portable video game system; and a support member rotatably coupled between the controller attachment device and the display attachment device, wherein the support member rotates with respect to the controller attachment device and the display attachment device to orient the display of the portable video game system in a user defined position.

Another embodiment includes an adapter for coupling to a controller and a display of a portable video game system, the adapter comprising: a controller attachment device configured to couple to a controller; a display attachment device coupled to the display of the portable video game system; and a support member coupled between the controller attachment device and the display attachment device, wherein the support member is rotatably coupled to the controller attachment device and rotatably coupled to the display attachment device, wherein the support member rotates with respect to the controller attachment device and the display attachment device rotates with respect to the support member to orient the display of the portable video game system in a user defined position and to position a center of mass of the display of the portable video game system over a center of mass of the controller attachment device to reduce torque on the controller attachment device and the user's hands and wrists.

Another embodiment includes a method of using an adapter for coupling a controller and a display of a portable video game system, the method comprising: coupling a controller to a controller attachment device of the adapter; coupling a display of a portable video game system to a display attachment device of the adapter; positioning the display to align a center of mass of the display over the controller; and reducing torque on the hands and wrist of the user in response to aligning the center of mass of the display over the controller.

Further still, another embodiment includes a method of coupling a controller and a display of a portable video game system, the method comprising: coupling a controller to a display; and flexibly positioning the display over the controller.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
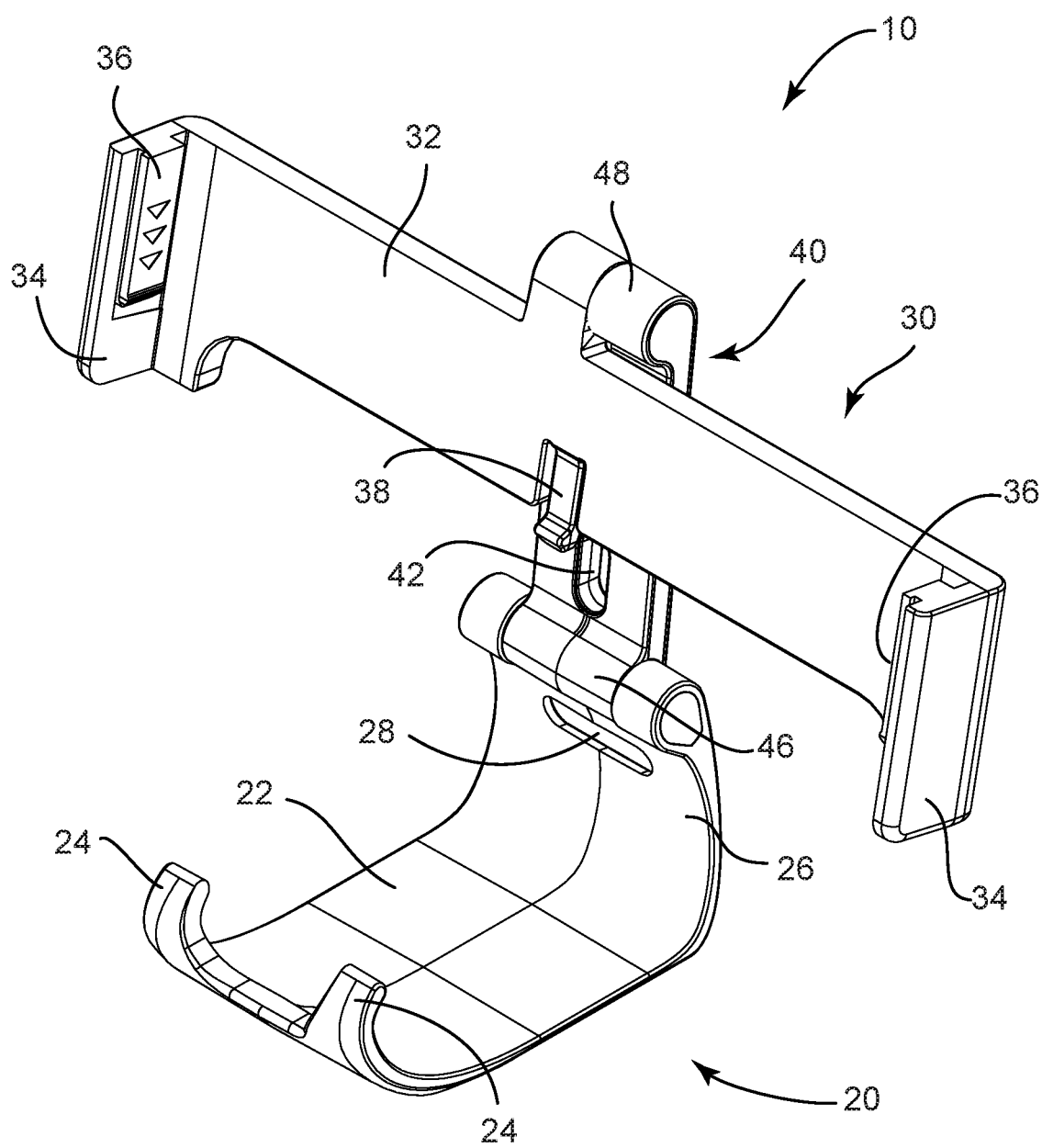
FIG. 1 is a perspective view of a video game controller adapter, according to an embodiment.
Figure 2:
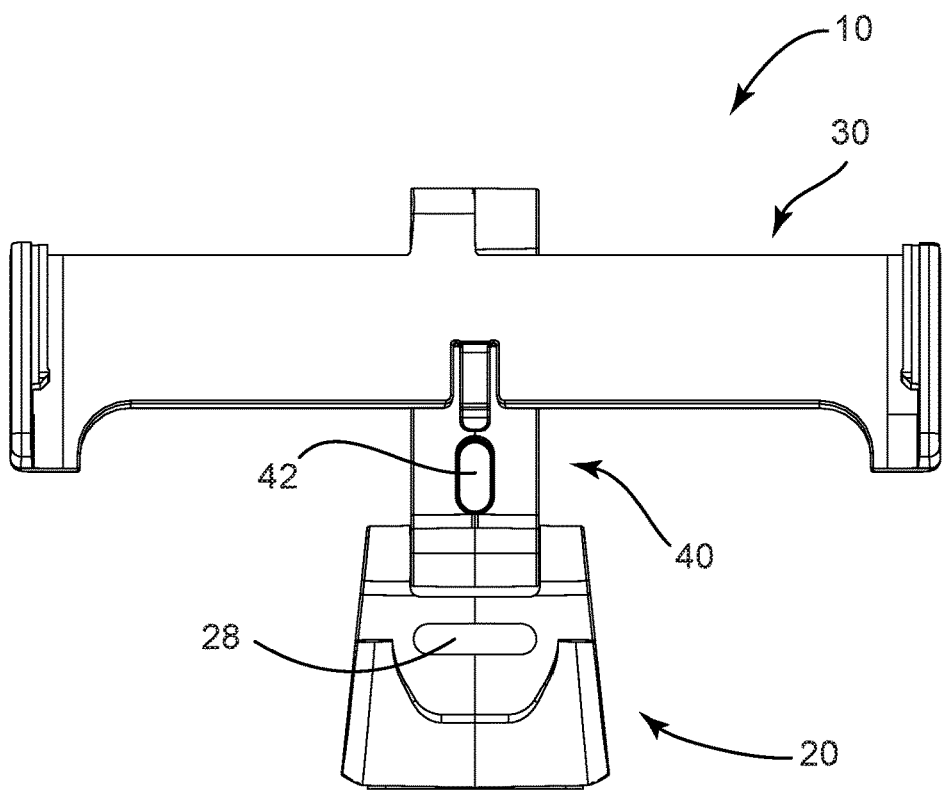
FIG. 2 is a front view of a video game controller adapter, according to an embodiment.
Figure 3:
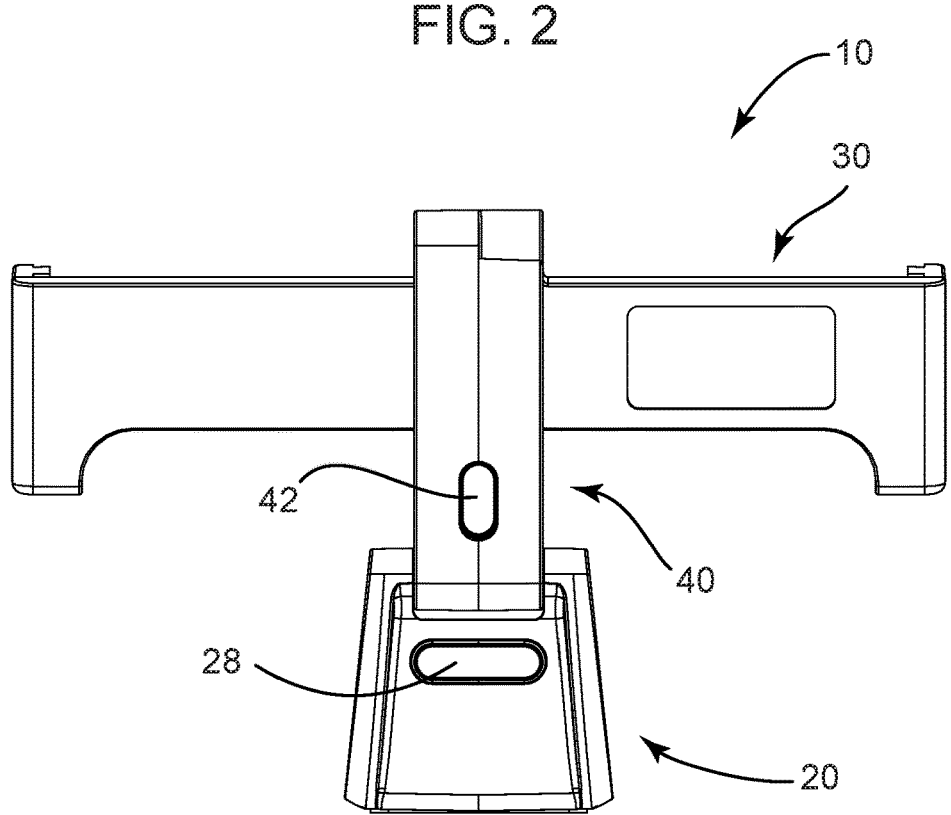
FIG. 3 is a rear view of a video game controller adapter, according to an embodiment.

Embodiments of the present invention relate to a video game controller adapter for holding a display of a portable video game system.

Depicted in FIGS. 1-4B is an adapter 10 that can be coupled to a controller 60 and hold a display of a portable video game system, as shown in FIGS. 5-8. The adapter 10 includes three components, a controller attachment device 20, a support member 40, and a display attachment device 30, that are joined by hinges 46 and 48. The controller may include the electronics necessary to operate the game system and control the action on the video game system the controller is associated with it.

The controller attachment device 20 may include a base portion 22, a clip portion 24 and a rear portion 26 with an aperture 28 extending through the rear portion. The rear portion 26 and the clip portion 24 are located on opposite ends of the base portion 22 and extend in a same direction away from the base portion 22. The clip portion 24 and the rear portion 26 operate to secure the controller within the controller attachment device 20 by a friction fit. The aperture 28 provides access to the charging port 62 of the controller 60 (as shown in FIG. 6).

Figure 6:
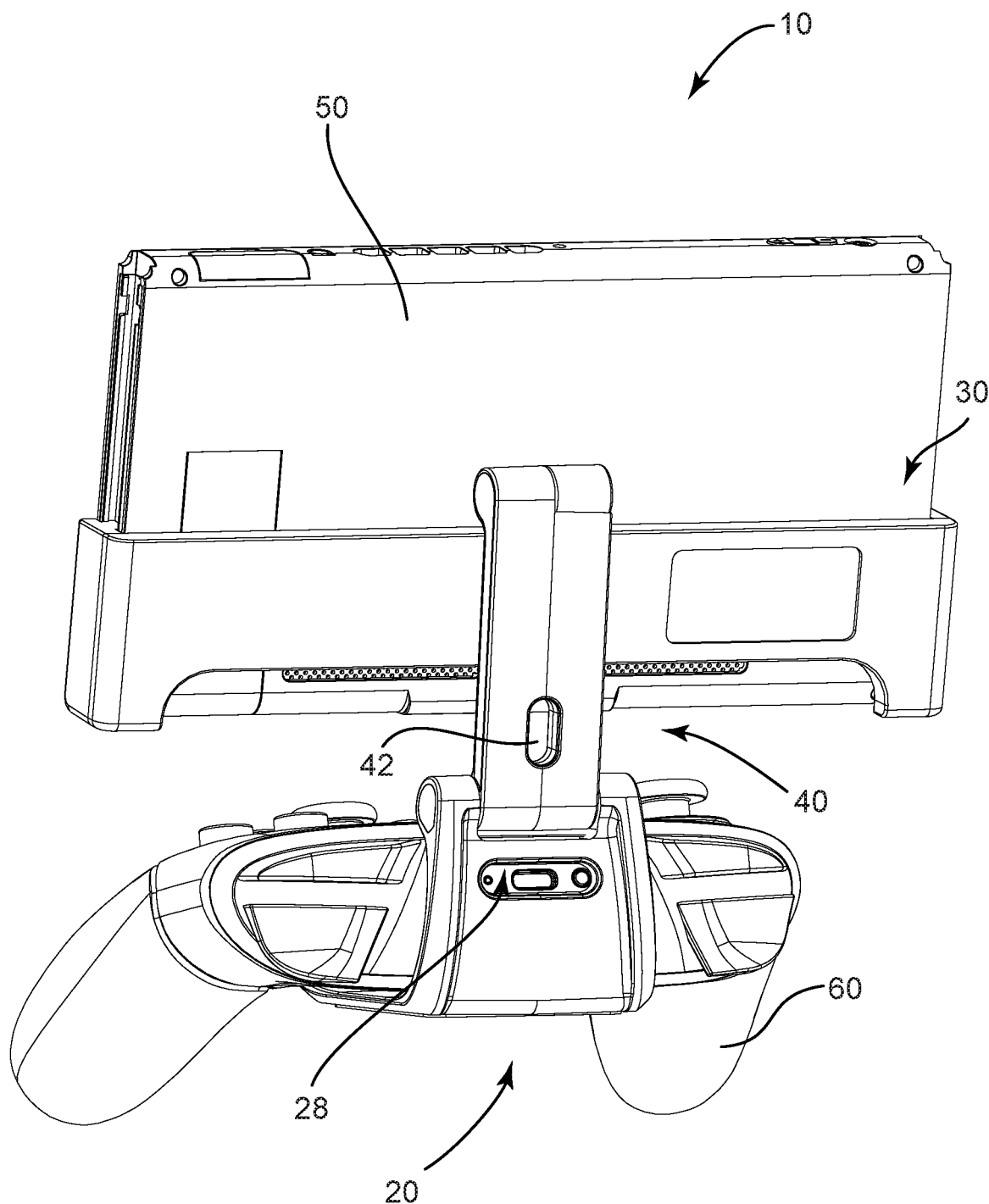
FIG. 6 is a rear perspective view of a video game controller adapter coupled to a display and a controller, according to an embodiment.
Figure 7:
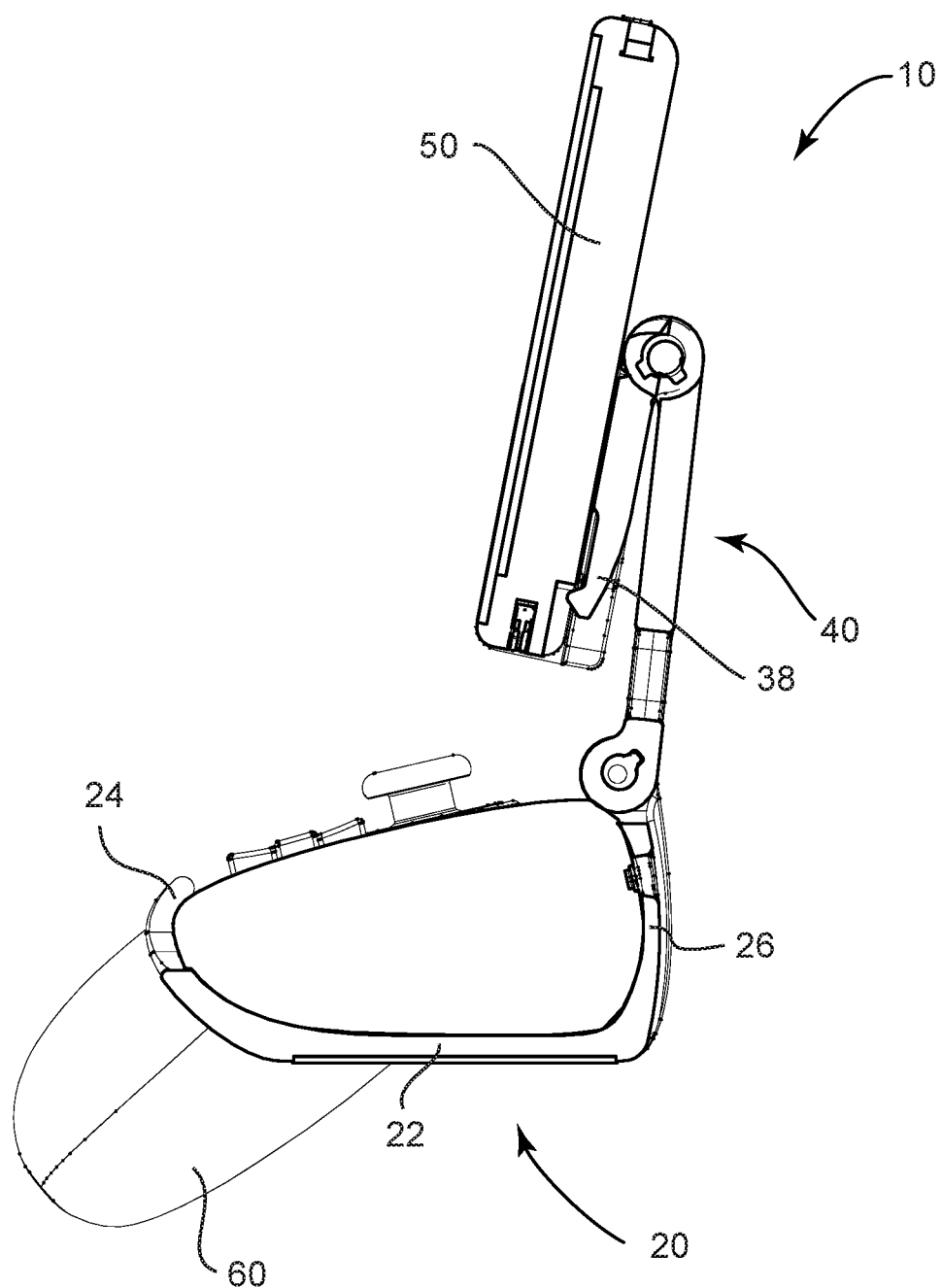
FIG. 7 is a side section view of a video game controller adapter coupled to a display and a controller, according to an embodiment.

The display attachment device 30 may include a base member 32 that extends along the length of a back of display 50 (as shown in FIG. 6). The display attachment device 30 may further include two side mount members 34, each side mount member 34 having a protrusion, wherein the protrusions have a size and shape to engage a groove of the display. The display attachment device 30 may further include a catch 38, wherein the catch operates to assist in retaining the display coupled to the display attachment device 30.

Figure 4B:
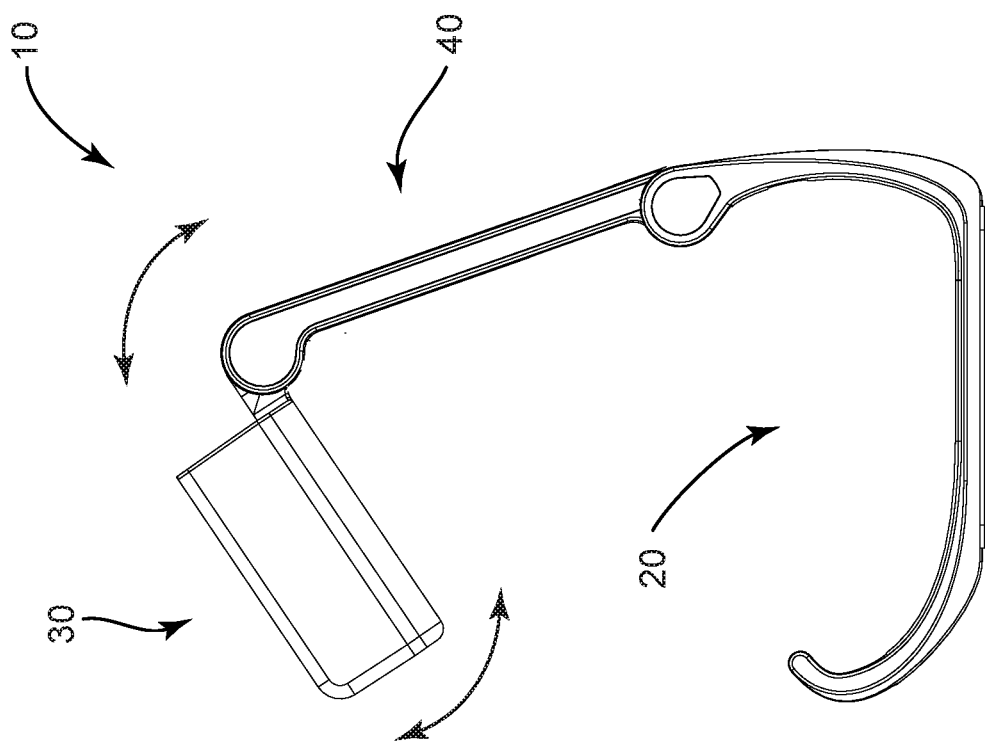
FIG. 4B is a side view of a video game controller adapter in a second rotated position, according to an embodiment.
Figure 4A:
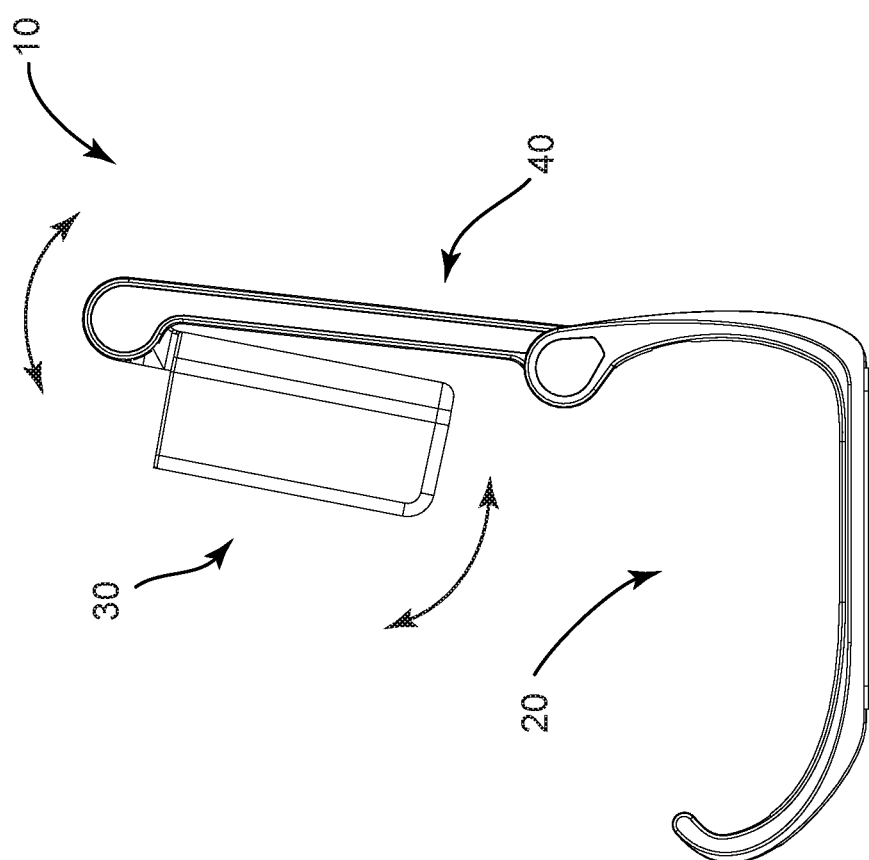
FIG. 4A is a side view of a video game controller adapter in a first position, according to an embodiment.
Figure 5:
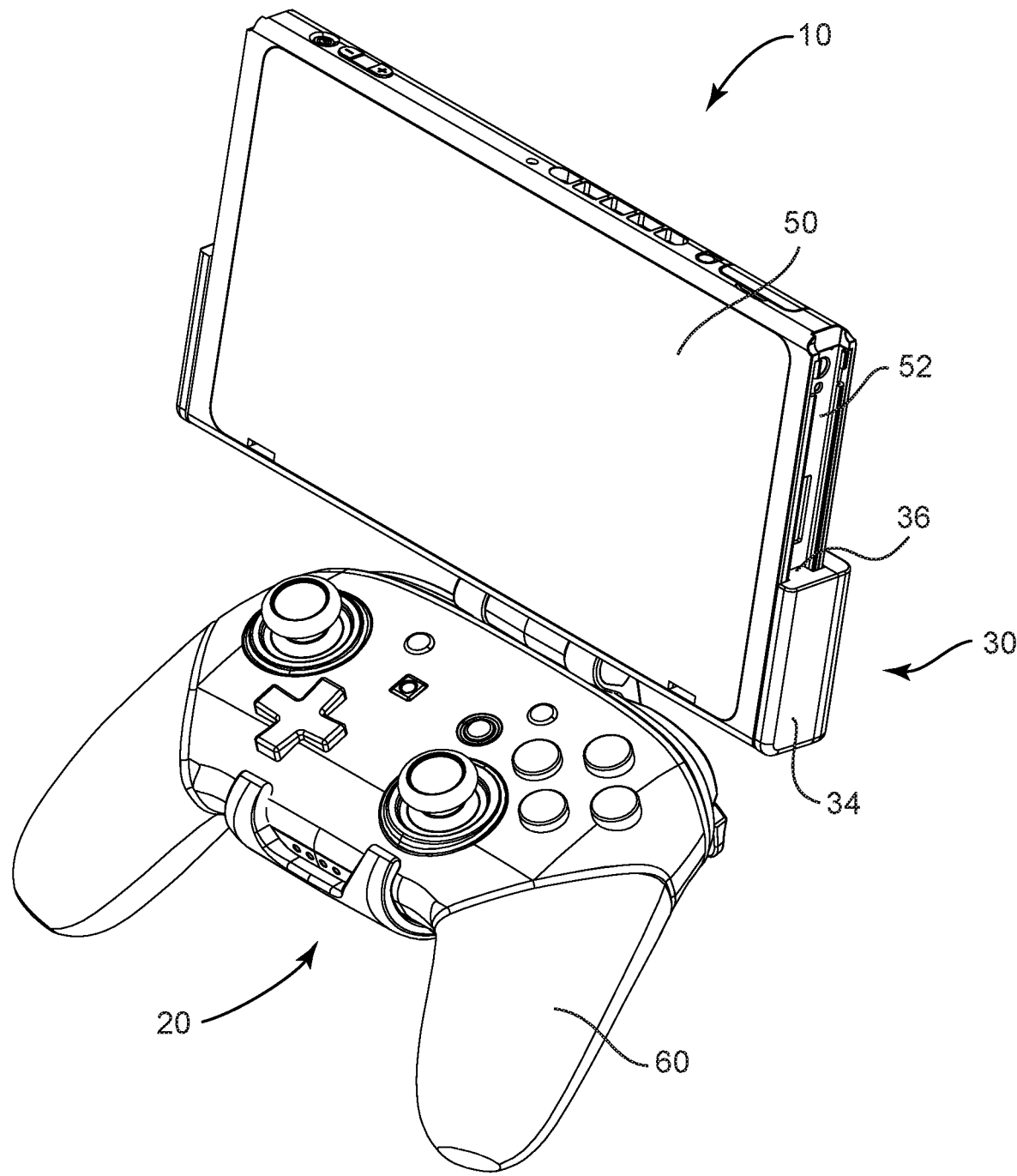
FIG. 5 is a perspective view of a video game controller adapter coupled to a display and a controller, according to an embodiment.

The device 10 may include a support member 40 coupled between the controller attachment device 20 and the display attachment device 30. The support member 40 includes an aperture 42 to provide access for a charging cable for the display 50 to extend through (as shown in FIG. 6). The support member 40 is rotatably coupled to the controller attachment device 20 with hinge 46 and rotatably coupled to the display attachment device 30 with hinge 48. Hinge 46 allows the support member 40 to rotate with respect to the controller attachment device 20. Hinge 48 allows the display attachment device 30 to rotate with respect to the support member 40. The hinges 46 and 48 are utilized to orient the display 50 of the portable video game system in a user defined position, as shown in FIGS. 4A and 4B. Further, the hinges 46 and 48 operate to orient the controller 60 in a user defined angle with respect to the display 50 of the portable video game system to place the controller in a comfortable position for the user.

Referring further to the drawings, FIGS. 5-8 depict the adapter 10 in use with a display 50 and a controller 60. The controller 60 may be coupled to the controller attachment device 20, wherein the controller 60 is secured by the clip portion 24 and the rear portion 26 in a friction fit or a snap-in fit. The display 50 is coupled between the side mount members 34. In the embodiment shown, a channel 52 of the display 50 is slidingly engaged with the protrusions 36 of the display attachment device 30.

Figure 8:
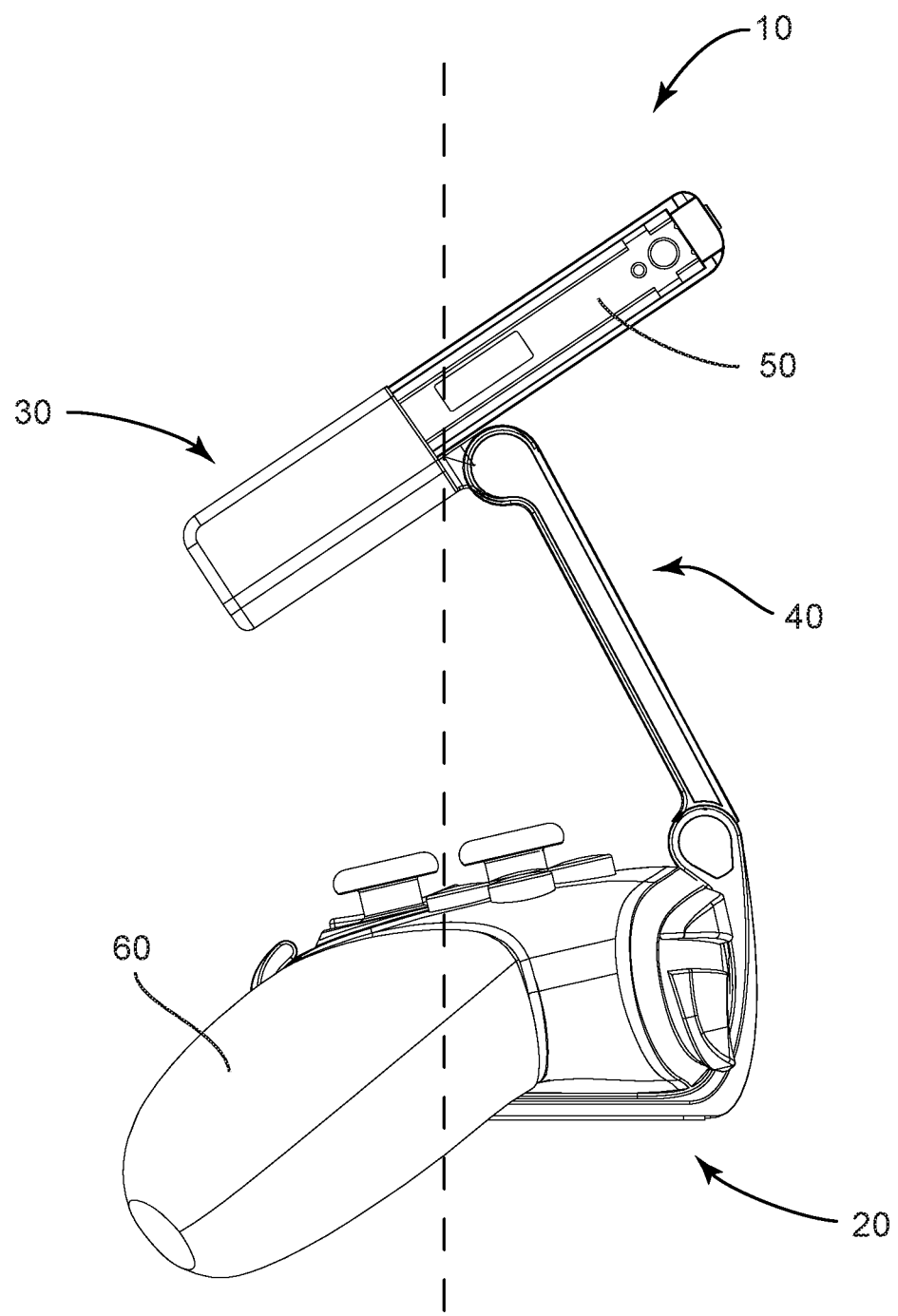
FIG. 8 is a side view of a video game controller adapter coupled to a display and a controller, according to an embodiment.

With the controller 60 and the display 50 coupled to the adapter, the display 50 may be rotated to position a center of mass of the display of the portable video game system over a center of mass of the controller to reduce torque on the wrists and hands of the user while holding the controller and playing the video game system (See FIG. 8). This provides for a more comfortable gaming experience.

Additionally, the drawing figures depict a display that is also the portable video game system. For example, the portable video game system is a Nintendo Switch, wherein the display 50 is also the portable video game system. In these embodiments, the controller is a Nintendo Switch Pro Controller. Accordingly, the display attachment device 30 includes a base member 32 rotatably coupled to the support member 40 and two side mount members 34 are coupled on opposing ends of the base member 32 and extending perpendicular to base member 32, wherein the two side mounts 34 operate to retain the Nintendo Switch within the display attachment device 30. Further, each side mount 34 of the display attachment device 30 further comprises a protrusion 36, wherein the protrusions 36 have a size and shape to engage a groove 52 of the Nintendo Switch 50, wherein the protrusions 36 slide within the grooves 52 on opposing ends of the Nintendo Switch 50 to secure the Nintendo Switch 50 within the display attachment device 30.

Figure 9:
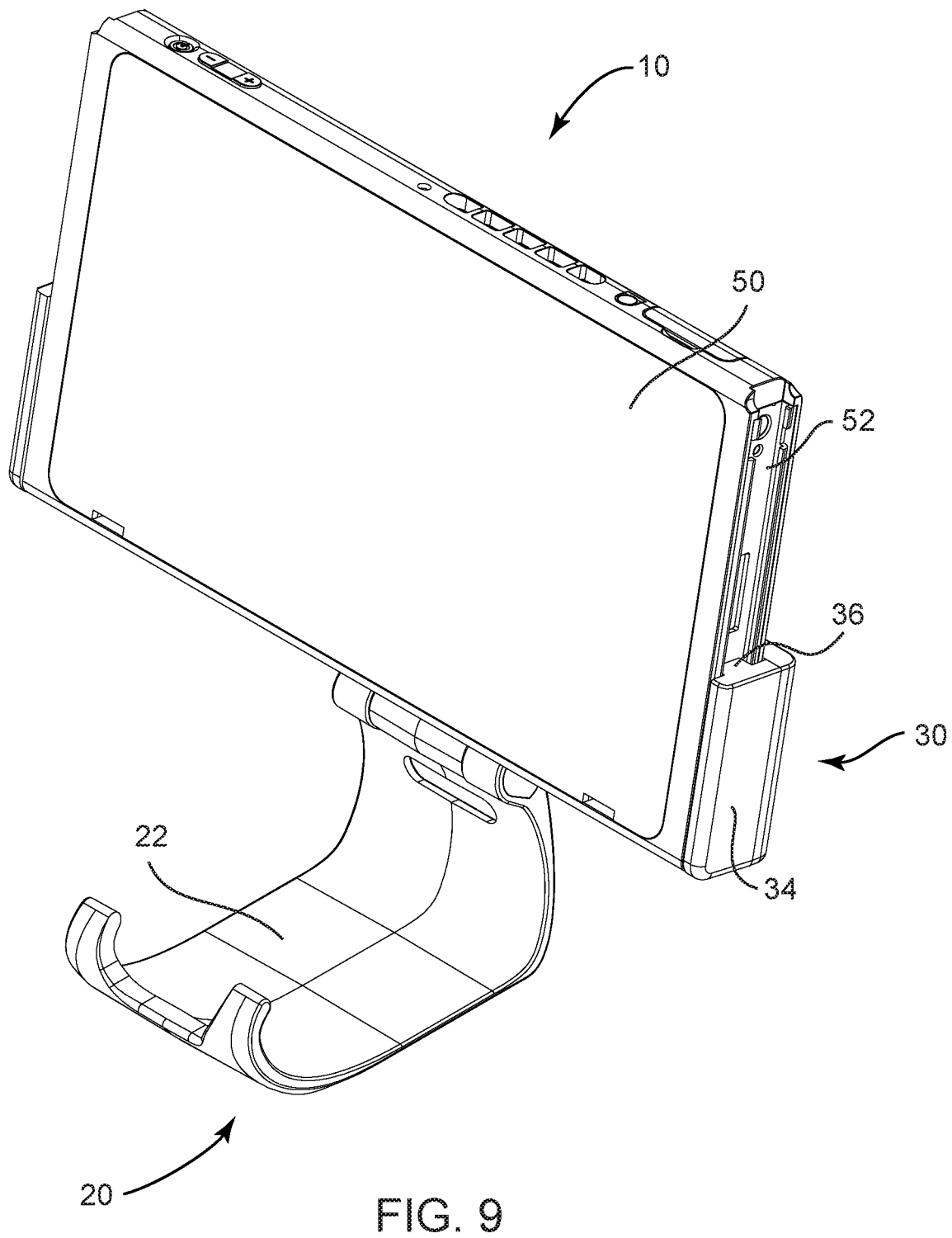
FIG. 9 is a perspective view of a video game controller adapter coupled to a display, according to an embodiment.

In an additional embodiment, shown in FIG. 9, the base portion 22 of the controller attachment device 20 may be flat and designed to balance on a level surface to allow for a tabletop mode of playing the video game system. This is especially useful for multiplayer gaming. In tabletop mode, the adapter allows plenty of space beneath the charging port to allow the user to plug in their device during game play. The display may be rotated into a position to resist tipping of the adapter.

Further still, the support member 40 rotates with respect to the controller attachment device 20 and the display attachment device 30 to orient the display 50 of the portable video game system in a folded position with a controller attachment device 20 located adjacent the display 50. Additionally, the controller attachment device 20 and the controller 60 are an integrated unitary member. In other words, the controller with all of the electronics for controlling the game system and the adapter that couples to the display of the game system (which may also be the entire game system) is a single unit or may be considered an integrated unitary member.

Another embodiment includes a method 70 of use of the adapter. The method 70 may include coupling a controller to a controller attachment device of the adapter (Step 71); coupling a display to a display attachment device of the adapter (Step 72); positioning the display to align the center of mass of the display over the controller (Step 73); and reducing torque on the hands and wrist of the user in response to aligning the center of mass of the display over the controller (Step 74).

Another embodiment includes a method of coupling a controller and a display of a portable video game system. The method includes coupling a controller to a display; and flexibly positioning the display over the controller. The method may also comprise positioning the display to align the center of mass of the display over the controller, and reducing torque on the hands and wrist of the user in response to aligning the center of mass of the display over the controller.

Accordingly, the components defining any video game controller adapter for holding a display of a portable video game system may be formed of any of many different types of materials or combinations thereof that can readily be formed into shaped objects provided that the components selected are consistent with the intended operation of a video game controller adapter for holding a display of a portable video game system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any video game controller adapter for holding a display of a portable video game system may be purchased pre-manufactured or manufactured separately and then assembled together. However, any or all of the components may be manufactured simultaneously and integrally joined with one another. Manufacturing of these components separately or simultaneously may involve 3D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An adapter for use with a controller and a display of a portable video game system, the adapter comprising:
   a controller attachment device comprising a base portion, a rear portion extending from a rear side of the base and a clip portion extending from a front side of the base, wherein the controller attachment device is configured to couple to a controller with a bottom side of the controller engaging the base, a rear side of the controller engaging the rear portion and a clip engaging a front and partially a top of the controller;
   a display attachment device configured to couple to the display of the portable video game system; and
   a support member rotatably coupled between the controller attachment device and the display attachment device, wherein the support member rotates with respect to the controller attachment device and the display attachment device to orient the display of the portable video game system in a user defined position.

2. The adapter of claim 1, wherein the display of the portable video game system can be placed in a user defined position with a center of mass of the display of the portable video game system over a center of mass of the controller to reduce torque on the wrist and hands of the user holding the controller creating increased comfort for the user.

3. The adapter of claim 1, wherein the clip of the controller attachment device retains a controller with protrusions that clip around the controller for a snap-in fit.

4. The adapter of claim 1, wherein the portable video game system is a system where the display and the portable video game system are a single unit.

5. The adapter of claim 4, wherein display attachment device includes a base member rotatably coupled to the support member and two side mount members are coupled on opposing ends of the base member and extending perpendicular to base member, wherein two side mounts operate to retain the single unit display and portable video game system within the display attachment device.

6. The adapter of claim 1, wherein the controller attachment device and the support member each have an aperture providing access to connect a charging cable to the display and to the controller respectively.

7. The adapter of claim 1, wherein the support member rotates with respect to the controller attachment device and the display attachment device to orient the display of the portable video game system in a folded position with a controller attachment device located adjacent the display.

8. The adapter of claim 1, wherein the controller attachment device and the controller are an integrated unitary member.

9. An adapter for coupling to a controller and a display of a portable video game system, the adapter comprising:
   a controller attachment device comprising a base portion, a rear portion extending from a rear side of the base and a clip portion extending from a front side of the base, wherein the controller attachment device is configured to couple to a controller with a bottom side of the controller engaging the base, a rear side of the controller engaging the rear portion and a clip engaging a front and partially a top of the controller;
   a display attachment device coupled to the display of the portable video game system; and
   a support member coupled between the controller attachment device and the display attachment device, wherein the support member is rotatably coupled to the controller attachment device and rotatably coupled to the display attachment device, wherein the support member rotates with respect to the controller attachment device and the display attachment device rotates with respect to the support member to orient the display of the portable video game system in a user defined position and to position a center of mass of the display of the portable video game system over a center of mass of the controller attachment device to reduce torque on the controller attachment device and the user's hands and wrists.

10. The adapter of claim 9, wherein the support member rotates with respect to the controller attachment device and the display attachment device rotates with respect to the support member to orient the controller attachment device in a user defined angle with respect to the display of the portable video game system.

11. The adapter of claim 9, wherein the portable video game system is a system where the display and the portable video game system are a single unit.

12. The adapter of claim 11, wherein display attachment device includes a base member rotatably coupled to the support member and two side mount members are coupled on opposing ends of the base member and extending perpendicular to base member, wherein two side mounts operate to retain the single unit display and portable video game system within the display attachment device.

13. The adapter of claim 9, wherein the controller attachment device comprises a flat surface on a bottom side, wherein the flat surface is configured to rest on a flat surface and support the display of a portable video game system on the flat surface without the controller coupled to the controller attachment system.

14. The adapter of claim 13, wherein the adapter is resistant to tipping in response to positioning the center of mass of the display of the portable video game system over the center of mass of the controller attachment device to reduce torque on the controller attachment device when the adapter is in use.

15. The adapter of claim 9, wherein the support member each have an aperture providing access to connect a charging cable to the display.

16. A method of coupling a controller and a display of a portable video game system, the method comprising:

coupling a controller to a display with an adapter comprising controller attachment device, a display attachment device, and a support member rotatably coupled between the controller attachment device and the display attachment device, wherein the display is coupled of the display attachment device and the controller is coupled o the controller attachment device in a position that hand grips of the controller are on either side of the controller attachment device; and flexibly positioning the display over the controller.

17. The method of claim 16, further comprising positioning the display to align the center of mass of the display over the controller.

18. The method of claim 17, further comprising reducing torque on the hands and wrist of the user in response to aligning the center of mass of the display over the controller.

\* \* \* \* \*